(12) United States Patent
Wilson et al.

(10) Patent No.: US 10,260,481 B2
(45) Date of Patent: Apr. 16, 2019

(54) SYSTEM AND METHOD FOR ASSESSING FARM-LEVEL PERFORMANCE OF A WIND FARM

(71) Applicant: General Electric Company, Schenectady, NY (US)

(72) Inventors: Megan Wilson, Greenville, SC (US); Stefan Kern, Munich (DE); Siddhanth Chandrashekar, Bangalore (IN); Akshay Ambekar, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 279 days.

(21) Appl. No.: 15/194,686

(22) Filed: Jun. 28, 2016

(65) Prior Publication Data

US 2017/0370348 A1    Dec. 28, 2017

(51) Int. Cl.
*F03D 17/00*    (2016.01)
*F03D 7/02*    (2006.01)
(Continued)

(52) U.S. Cl.
CPC ............. *F03D 17/00* (2016.05); *F03D 7/024* (2013.01); *F03D 7/028* (2013.01); *F03D 7/0224* (2013.01);
(Continued)

(58) Field of Classification Search
CPC ........ F03D 17/00; F03D 7/0224; F03D 7/024; F03D 7/028; F03D 7/048; F03D 9/257;
(Continued)

(56) References Cited

U.S. PATENT DOCUMENTS 7,941,304 B2    5/2011    Gundling
8,050,899 B2    11/2011    Gignuere et al.
(Continued)

FOREIGN PATENT DOCUMENTS

WO    WO2013152776 A1    10/2013

OTHER PUBLICATIONS

Park, J., and Law, K.H., "A data-driven, cooperative wind farm control to maximize the total power production," Applied Energy, vol. 165, pp. 151-165 (Dec. 31, 2016).
(Continued)

*Primary Examiner* — Abdelmoniem I Elamin
(74) *Attorney, Agent, or Firm* — Dority & Manning, P.A.

(57) ABSTRACT

The present disclosure is directed to a system and method for assessing farm-level performance of a wind farm. The method includes operating the wind farm in a first operational mode and identifying one or more pairs of wind turbines having wake interaction. The method also includes generating a pairwise dataset for the wind turbines pairs. Further, the method includes generating a first wake model based on the pairwise dataset and predicting a first farm-level performance parameter based on the first wake model. The method also includes operating the wind farm in a second operational mode and collecting operational data during the second operational mode. Moreover, the method includes predicting a first farm-level performance parameter for the second operational mode using the first wake model and the operational data from the second operational mode. The method further includes determining a second farm-level performance parameter during the second operational mode. Thus, the method includes determining a difference in the farm-level performance of the wind farm as a function of the first and second farm-level performance parameters.

18 Claims, 8 Drawing Sheets

(51) Int. Cl.
 *F03D 7/04* (2006.01)
 *F03D 9/25* (2016.01)
(52) U.S. Cl.
 CPC ............ *F03D 7/048* (2013.01); *F03D 9/257* (2017.02); *F05B 2260/82* (2013.01); *F05B 2260/821* (2013.01); *F05B 2260/84* (2013.01); *F05B 2270/1033* (2013.01); *F05B 2270/32* (2013.01); *F05B 2270/321* (2013.01); *F05B 2270/335* (2013.01); *F05B 2270/502* (2013.01); *G05B 2219/2619* (2013.01); *Y02E 10/723* (2013.01)
(58) Field of Classification Search
 CPC ............ F05B 2260/82; F05B 2260/821; F05B 2260/84; F05B 2270/1033; F05B 2270/32; F05B 2270/321; F05B 2270/335; F05B 2270/502; G05B 2219/2619; Y02E 10/723
 See application file for complete search history.

(56) References Cited

U.S. PATENT DOCUMENTS

| | | | |
|---|---|---|---|
| 8,295,987 | B2 | 10/2012 | Gadre et al. |
| 9,091,245 | B2* | 7/2015 | Lobato Pena ........... H02J 3/386 |
| 9,644,610 | B2* | 5/2017 | Dalsgaard ............... F03D 7/048 |
| 2009/0192868 | A1 | 7/2009 | Rajiv et al. |
| 2010/0274400 | A1 | 10/2010 | Ormel et al. |
| 2010/0274401 | A1 | 10/2010 | Kjaer et al. |
| 2012/0053983 | A1 | 3/2012 | Vittal et al. |
| 2012/0133138 | A1* | 5/2012 | Sorensen ................ F03D 7/028 290/44 |
| 2012/0282091 | A1* | 11/2012 | Esbensen ............... F03D 7/0224 416/1 |
| 2013/0103202 | A1* | 4/2013 | Bowyer ................. F03D 7/0292 700/275 |
| 2013/0166082 | A1 | 6/2013 | Ambekar et al. |
| 2013/0184838 | A1 | 7/2013 | Tchoryk, Jr. et al. |
| 2013/0272844 | A1* | 10/2013 | Lobato Pena ........... H02J 3/386 415/1 |
| 2015/0240789 | A1* | 8/2015 | Lu ........................... F03D 17/00 702/45 |
| 2015/0278405 | A1* | 10/2015 | Andersen ............. G06F 17/5009 703/18 |
| 2016/0025071 | A1 | 1/2016 | Wang et al. |
| 2016/0265513 | A1* | 9/2016 | Evans ..................... F03D 13/30 |
| 2017/0037832 | A1* | 2/2017 | Friedrich .............. F03D 7/0224 |
| 2017/0284368 | A1* | 10/2017 | Franke .................. F03D 7/0292 |
| 2017/0328348 | A1 | 11/2017 | Wilson et al. |
| 2017/0335827 | A1 | 11/2017 | Wilson et al. |
| 2018/0073486 | A1* | 3/2018 | Zhang ..................... F03D 7/048 |

OTHER PUBLICATIONS

Extended European Search Report and Opinion issued in connection with corresponding EP Application No. 17178201.4 dated Dec. 1, 2017.

* cited by examiner

SYSTEM AND METHOD FOR ASSESSING FARM-LEVEL PERFORMANCE OF A WIND FARM

FIELD OF THE INVENTION

The present invention relates generally to wind farms, and more particularly, to systems and methods for assessing farm-level performance of a wind farm via pairwise cascade maps.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

Traditionally, wind farms are controlled in a decentralized fashion to generate power such that each turbine is operated to maximize local energy output and to minimize impacts of local fatigue and extreme loads. To this end, each turbine includes a control module, which attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

However, in practice, such independent optimization of the wind turbines ignores farm-level performance goals, thereby leading to sub-optimal performance at the wind farm level. For example, downwind turbines may experience large wake effects caused by one or more upwind or upstream turbines. Because of such wake effects, downwind turbines receive wind at a lower speed, drastically affecting their power output (as power output increases with wind speed). Consequently, maximum efficiency of a few wind turbines may lead to sub-optimal power output, performance, or longevity of other wind turbines in the wind farm.

In addition, there are many products, features, and/or upgrades available for wind turbines and/or wind farms configured to minimize wake effects and/or increase power production of the wind farm. Conversely, there are upgrades aimed at increasing single-turbine performance that may unintentionally have adverse impacts on overall wake losses within the wind farm. In either situation, it is advantageous to efficiently verify impact on overall wake losses of the wind farm, however, such verification can be difficult to obtain.

More specifically, when assessing changes in farm-level performance, most existing approaches rely on cumulative farm-level energy production, which is prohibitive in terms of data retention because it may require all turbines to be simultaneously in a valid operating state for a time-stamp to be considered valid (full/partial load operation, no curtailment, etc.). This requirement generally results in a substantial reduction (e.g. 70-80%) in the size of the overall dataset.

Thus, a system and method for assessing changes in farm-level performance of a wind farm via pairwise cascade maps that addresses the aforementioned issues would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for verifying farm-level performance of a wind farm. The method includes operating the wind farm in a first operational mode for a predetermined time period and identifying one or more pairs of wind turbines having wake interaction during the first operational mode. The method also includes generating a pairwise dataset for the one or more pairs of wind turbines. Further, the method includes generating a first wake model based on the pairwise dataset. The method also includes operating the wind farm in a second operational mode and collecting operational data during the second operational mode. The second operational mode is operated at a different time period than the first operational mode. Moreover, the method includes predicting a first farm-level performance parameter for the second operational mode using the first wake model and the operational data collected during the second operational mode. In addition, the method includes determining a second farm-level performance parameter during the second operational mode. Thus, the method includes determining a difference in the farm-level performance of the wind farm as a function of the first and second farm-level performance parameters.

In one embodiment, the first and second farm-level performance parameters may include a power output for the first and second operational modes, respectively. In another embodiment, the first operational mode may correspond to a baseline operational mode and the second operational mode may correspond to an optimized operational mode.

Thus, in certain embodiments, the step of determining the second farm-level performance parameter may include collecting operational data from one or more wind turbines in the wind farm during the second operational mode, determining a power output for each of the wind turbines in the wind farm based on the collected operational data, and summing the power outputs from each of the wind turbines in the wind farm during the second operational mode to determine a total second power output.

In further embodiments, the step of predicting the first farm-level performance parameter may include collecting operational data from one or more wind turbines in the wind farm during the first operational mode, building the first wake model based on the operational data to predict the power at one or more downstream turbines, applying the first wake model to predict a power output that would have been observed for the one or more downstream wind turbines during the second operational mode, and summing the power output from the one or more wind turbines to determine a total predicted first power output.

In certain embodiments, the step of generating the first wake model based on the pairwise dataset may include generating the first wake model using Gaussian Kernel Regression. In another embodiment, the method may include tuning the first wake model to reduce a first operational mode prediction error. Furthermore, these methods would also be applicable in instances where a second wake model is generated.

In additional embodiments, the step of determining the difference in the farm-level performance of the wind farm as a function of the first and second farm-level performance parameters may include comparing the total first power output and the total second power output.

In another embodiment, the step of determining the difference in the farm-level performance of the wind farm as a function of the first and second farm-level performance parameters may include determining a power difference between the total second power output and the total first power output over a predetermined time period, binning the power difference by farm inflow wind speed and wind direction, and weighting the binned power differences by long-term wind distribution.

In yet another embodiment, the step of determining the difference in the farm-level performance of the wind farm as a function of the first and second farm-level performance parameters may include generating a second wake model for the second operational mode, estimating a first power output and a second power output from the first and second wake models, and comparing the first power output and the second power output so as to verify the farm-level performance.

In further embodiments, the pairwise dataset may include a relative wind direction between the pairs, a pair distance, a turbulence intensity at a corresponding free stream turbine for each of the pairs, and a power at an upstream wind turbine, a power at a downstream wind turbine, and/or a power at a corresponding free stream turbine, or any combinations thereof.

In still further embodiments, the method may include operating the wind farm in the second operational mode without toggling to the first operational mode.

In additional embodiments, the operational data collected during the first and second operational modes may include any one of or a combination of the following: nacelle position, power output, torque output, pitch angle, tip speed ratio, rotor speed, yaw angle, thrust, operating state, curtailment demands, geographical information, temperature, pressure, wind turbine location, wind farm location, weather conditions, wind gusts, wind speed, wind direction, wind acceleration, wind turbulence, wind shear, wind veer, wake, or any other operational parameters of the wind farm and/or the wind turbines therein.

In another aspect, the present disclosure is directed to a method for verifying farm-level performance of a wind farm. The method includes identifying one or more pairs of wind turbines having wake interaction during operation of the wind farm. The method also includes generating a pairwise dataset for the one or more pairs of wind turbines. Further, the method includes generating a first wake model based on the pairwise dataset. Another step includes determining a first farm-level performance parameter for the first operational mode based on the first wake model. Thus, the method also includes verifying the farm-level performance of the wind farm as a function of the first farm-level performance parameter.

In yet another aspect, the present disclosure is directed to a system for verifying farm-level performance of a wind farm. The system includes one or more sensors configured to measure operational data of the wind farm and one or more controllers communicatively coupled with the one or more sensors. As such, the controller(s), which may include the farm controller, an individual turbine controller, or a separate offline computer, is configured to perform one or more operations, including but not limited to operating the wind farm in a first operational mode for a predetermined time period, identifying one or more pairs of wind turbines having wake interaction during the first operational mode, generating a pairwise dataset for the one or more pairs of wind turbines, generating a wake model based on the pairwise dataset, operating the wind farm in a second operational mode and collecting operational data during the second operational mode, the second operational mode being operated at a different time period than the first operational mode, predicting a first farm-level performance parameter for the second operational mode using the first wake model and the operational data collected during the second operational mode, determining a second farm-level performance parameter during the second operational mode, and verifying the farm-level performance of the wind farm as a function of the first and second farm-level performance parameters. It should be understood that the system may further include any of the additional features as described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
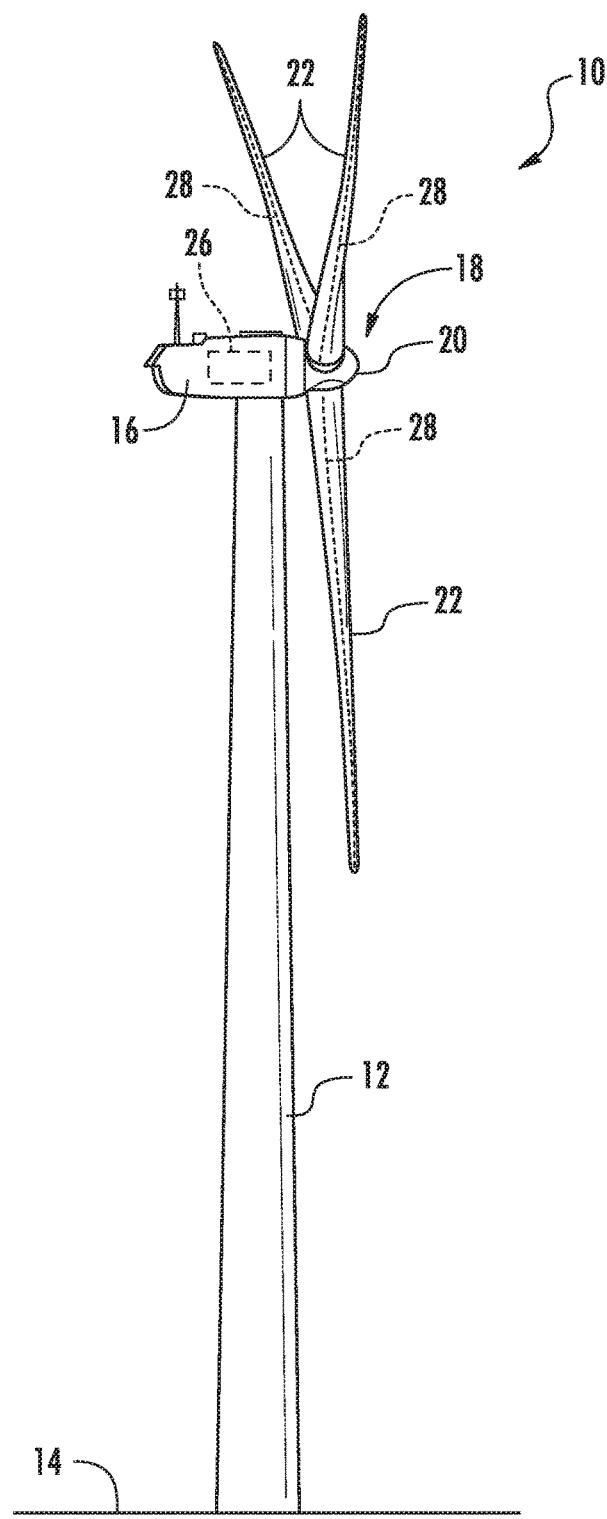
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for verifying farm-level performance of a wind farm provided by one or more modifications, e.g. wake control upgrades. More specifically, in certain embodiments, the present disclosure relies on developing a map of pairwise performance between interacting wind turbines in a first operational mode, e.g. a baseline/nominal operational mode, and cascading these interactions through the layout of the wind turbines in the wind farm to develop an equivalent performance that coincides with an observed time-series of a second operational mode. Thus, the first operational mode describe a pairwise relationship between upstream and downstream turbine performance as a function of the spatial relationship between them, power produced, and/or wind speed at the upstream turbine, and may also consider additional parameters such as turbulence intensity, air density, etc. As such, the method of the present disclosure assesses farm-level performance by comparing a pairwise-modeled power production computed from the first operational mode cascaded out to total farm-level production of a second operational mode with a measured power production of the second operational mode for the entire wind farm.

The various embodiments of the system and method of the present disclosure provide numerous advantages not present in the prior art. For example, the present disclosure does not require full-farm availability and therefore loss of data is avoided. Additionally, it is possible to build a first mode pairwise mapping for an entire site from a subsample of wind turbines in the layout as long as the turbines are selected in a manner where the subsample covers the full mapping domain required for the site. Further, due to how well refined the pairwise mapping of the first operational mode can be, the present disclosure removes the necessity for a toggle period (i.e. between the first and second operational modes) and can instead rely on data pulled from pre-existing historic data for the first operational mode if desired. For a controls-based change between the first and second operational modes, this is commercially advantageous since only 50% of a production benefit is physically realizable when the wind turbines spend their time switching between the first and second operational modes. Furthermore, the present disclosure can also be applied in situations where a toggle-based approach would be impractical, such as in the case of a hardware change between the first and second operational modes. In addition, the present disclosure also has the potential to reduce the overall duration of the measurement campaign by utilizing historic data for the first operational mode, i.e. data must only be collected for the second operational mode, thereby yielding results twice as fast.

In further embodiments, the present disclosure can also be utilized for power production/performance guarantees by using the first operational mode maps (e.g. FIG. 6) to define performance expectations. Moreover, the present disclosure can be leveraged for power production forecasting and may be advantageous over a simplistic engineering model because it can be tuned to a specific wind farm site. Additionally, for a given turbine type, the pairwise maps generated from data at one wind farm may also be applicable to other wind farms, which could also enable a first operational mode pairwise mapping to be applicable for pre-construction assessments. Similarly, this approach could enable first operational mode maps to consider a large aggregated pairwise dataset, e.g., across multiple sites, geographical regions, or specific turbine models across an entire fleet, to develop the first operational mode map.

As used herein, "upstream" wind turbine generally refers to a wind turbine having one or more wind turbines downstream thereof with respect to an incoming wind direction. Further, a "freestream" wind turbine generally refers to an upstream wind turbine having no other wind turbines upstream thereof with respect to an incoming wind direction. In addition, as used herein, a "downstream" wind turbine generally refers to a wind turbine having one or more wind turbines upstream thereof.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
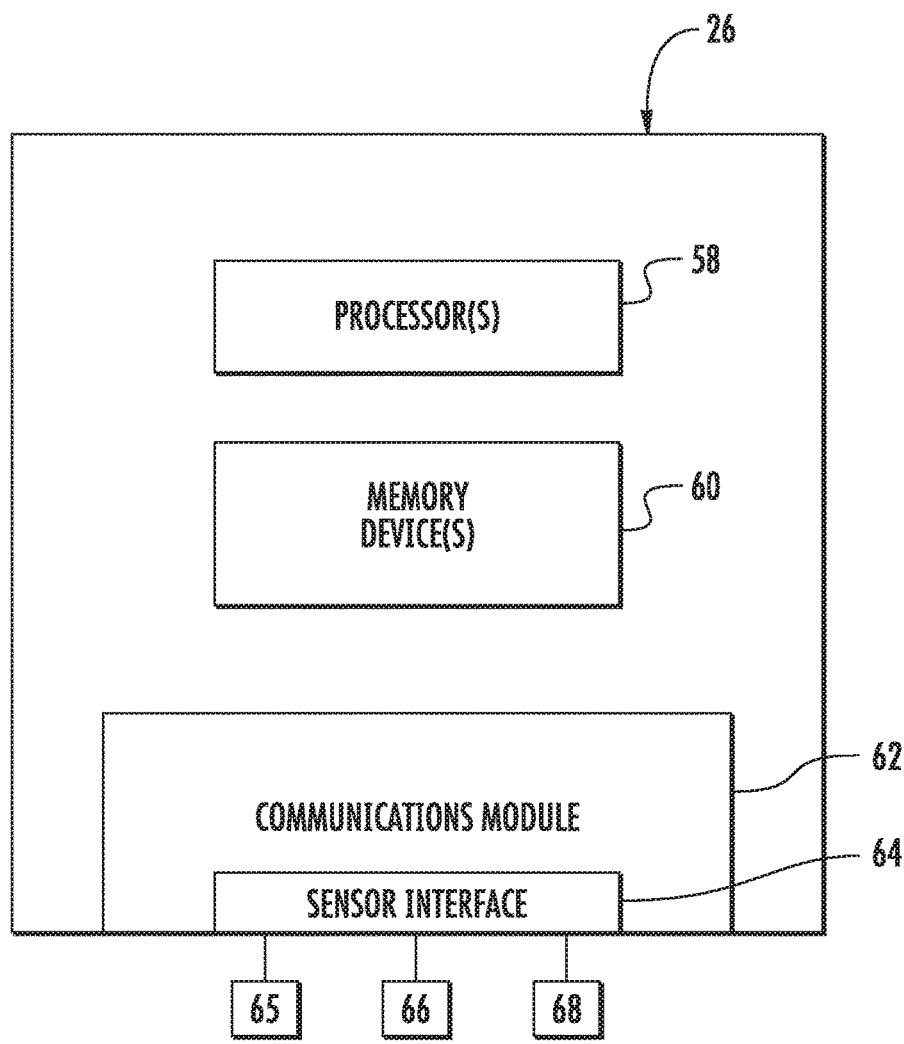
FIG. 2 illustrates a schematic view of one embodiment of a controller for use with the wind turbine shown in FIG. 1.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 68 to be converted into signals that can be understood and processed by the controller 26. Furthermore, it should be appreciated that the sensors 65, 66, 68 may be communicatively coupled to the communications module 62 using any suitable means. For example, as shown in FIG. 2, the sensors 65, 66, 68 are coupled to the sensor interface 64 via a wired connection. However, in alternative embodiments, the sensors 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 68.

The sensors 65, 66, 68 may be any suitable sensors configured to measure any operational data of the wind turbine 10 and/or wind parameters of the wind farm 200. For example, the sensors 65, 66, 68 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 68 may, for example, be used to generate signals relating to the parameter being monitored, which can then be utilized by the controller 26 to determine the actual condition.

Figure 3:
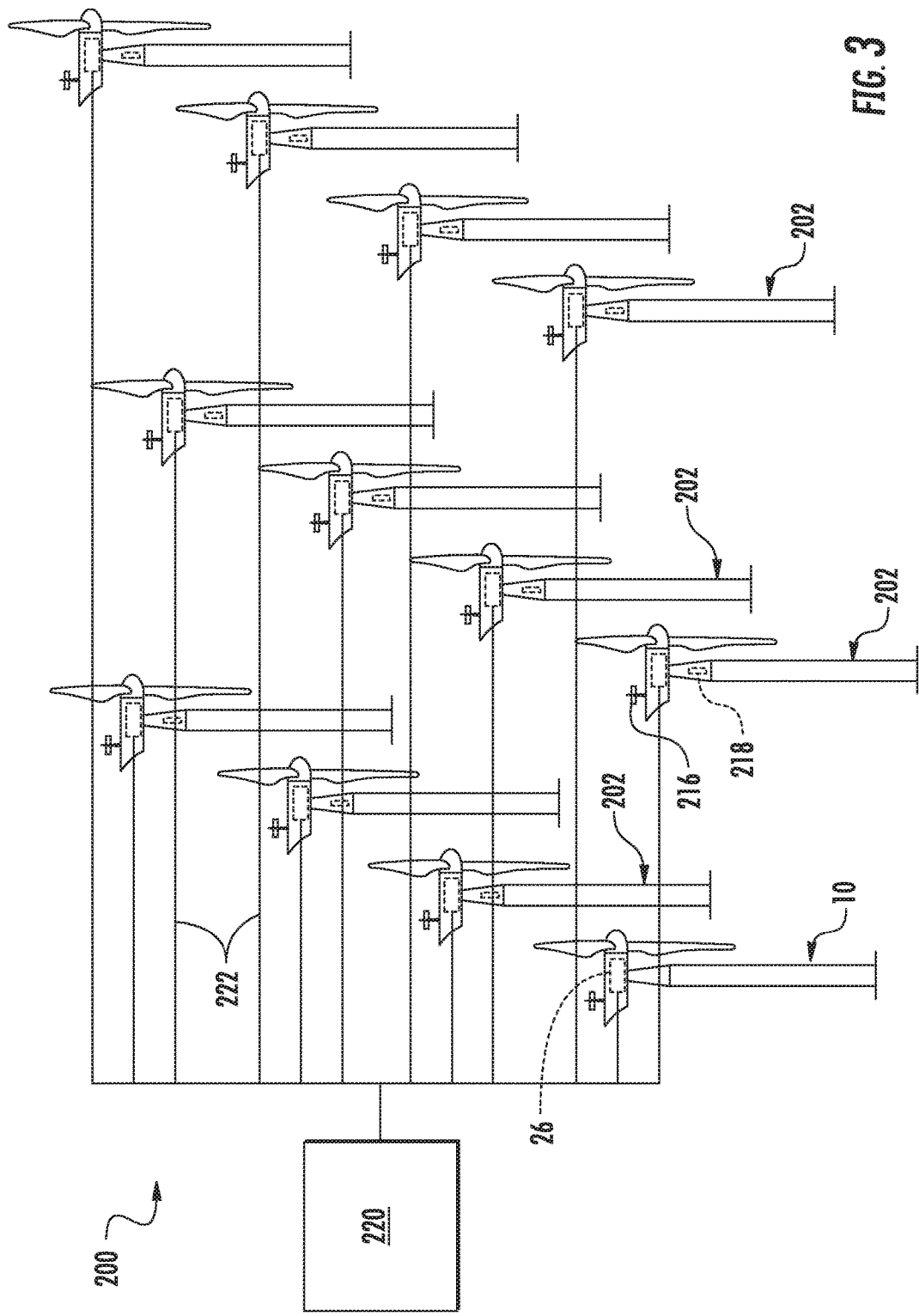
FIG. 3 illustrates a schematic view of one embodiment of a wind farm according to the present disclosure.

Referring now to FIG. 3, a wind farm 200 that is controlled according to the system and method of the present disclosure is illustrated. As shown, the wind farm 200 may include a plurality of wind turbines 202, including the wind turbine 10 described above, and a farm controller 220. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 220 through a wired connection, such as by connecting the controller 26 through suitable communicative links 222 (e.g., a suitable cable). Alternatively, the controller 26 may be communicatively coupled to the farm controller 220 through a wireless connection, such as by using any suitable wireless communications protocol known in the art. In addition, the farm controller 220 may be generally configured similar to the controllers 26 for each of the individual wind turbines 202 within the wind farm 200.

In several embodiments, one or more of the wind turbines 202 in the wind farm 200 may include a plurality of sensors for monitoring various operational data of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 200. Thus, the wind sensor(s) 216 may allow for the local wind speed at each wind turbine 202 to be monitored. In addition, the wind turbine 202 may also include one or more additional sensors 218. For instance, the sensors 218 may be configured to monitor electrical properties of the output of the generator of each wind turbine 202, such as current sensors, voltage sensors, temperature sensors, or power sensors that monitor power output directly based on current and voltage measurements. Alternatively, the sensors 218 may include any other sensors that may be utilized to monitor the power output of a wind turbine 202. It should also be understood that the wind turbines 202 in the wind farm 200 may include any other suitable sensor known in the art for measuring and/or monitoring wind parameters and/or wind turbine operational data.

Figure 4:
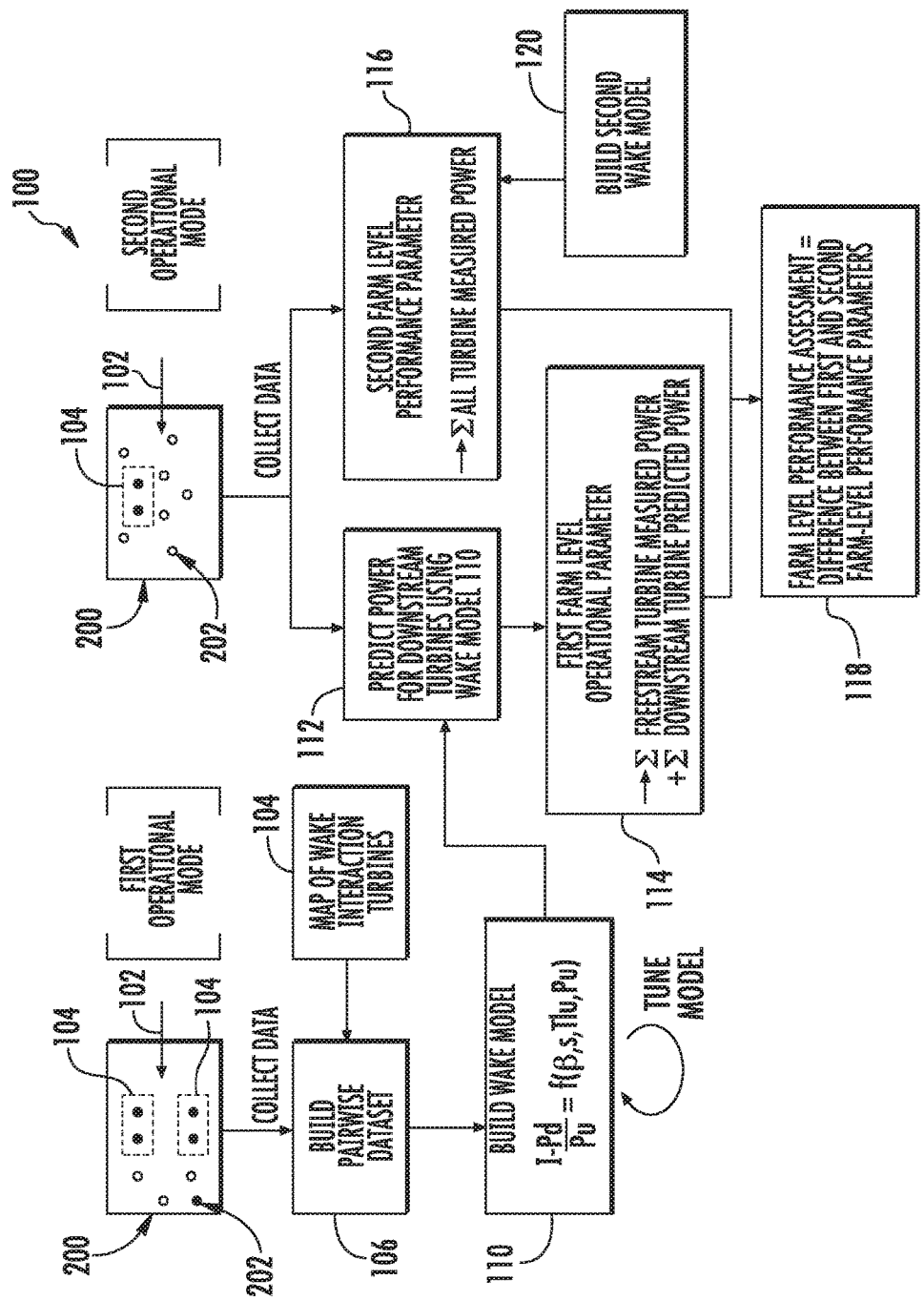
FIG. 4 illustrates a schematic diagram of one embodiment of a system for verifying farm-level performance of a wind farm provided by one or more wake controls according to the present disclosure.
Figure 5:
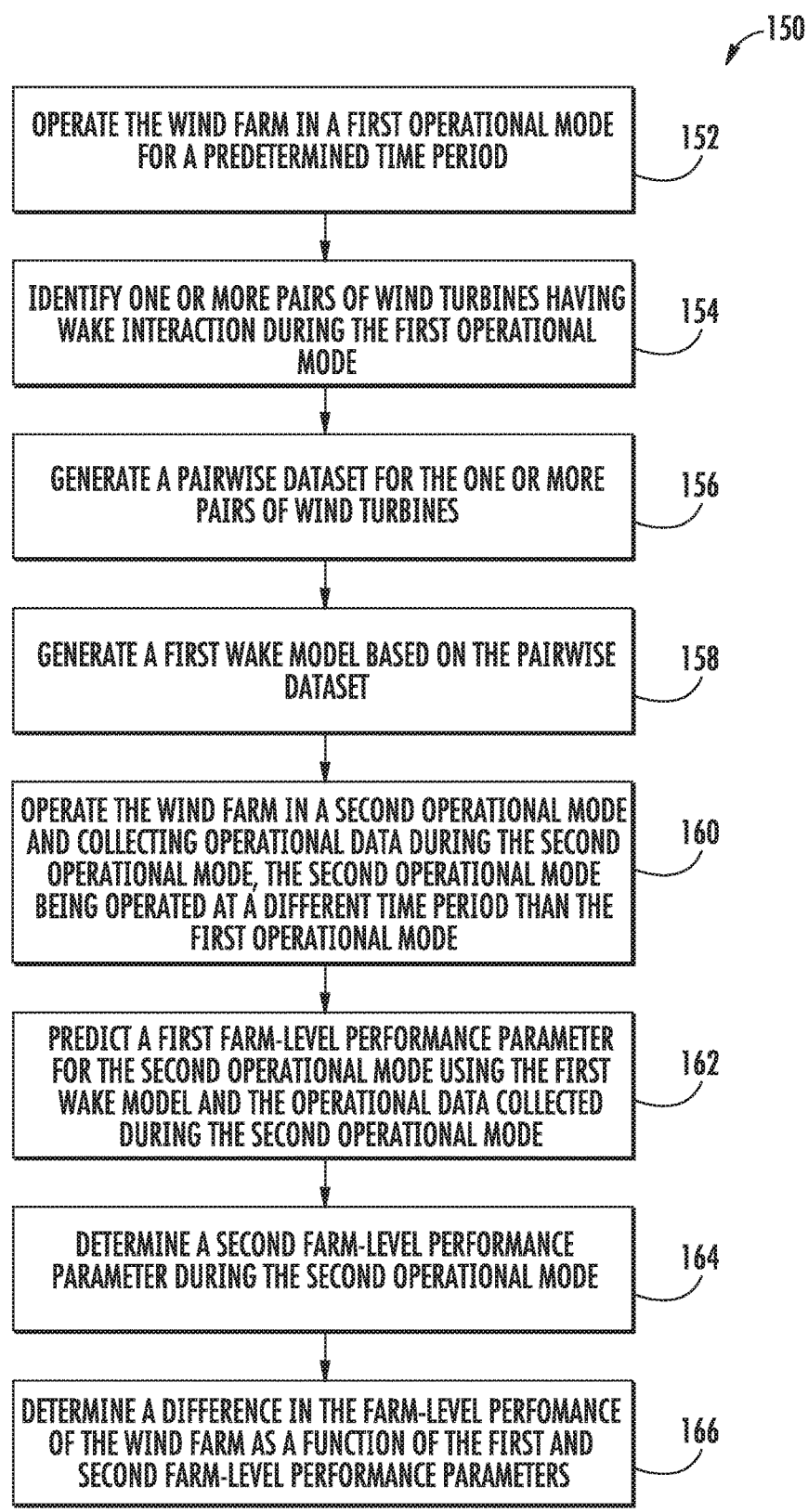
FIG. 5 illustrates a flow diagram of one embodiment of a method for verifying farm-level performance of a wind farm provided by one or more wake controls according to the present disclosure.

Referring now to FIGS. 4 and 5, a system 100 and method 150 for verifying farm-level performance of a wind farm 200 are illustrated, respectively. More specifically, FIG. 4 illustrates a schematic diagram of one embodiment of the system 100, whereas FIG. 5 illustrates a flow diagram of one embodiment of the method 150. The system 100 may include one or more sensors (e.g. 65, 66, 68, 216, 218) configured to measure operational data of the wind farm 200 and a controller (e.g. farm controller 220, the individual wind turbine controllers 26, and/or a separate online or offline computer) communicatively coupled with the sensor(s) such that the controller 220 may be configured to perform any of the steps of the method 150 as described herein. Further, in additional embodiments, the method 150 of the present disclosure may be performed manually via a separate computer not associated with the wind farm 200.

Thus, as shown at 152, the method 150 includes operating the wind farm 200 in a first operational mode for a predetermined time period. In one embodiment, the first operational mode may correspond to a baseline/nominal operational mode. Further, in certain embodiments, the wind farm 200 may be operated in the first operational mode for days, weeks, months, or longer and the data may be stored. Thus, in certain embodiments, the controllers 26, 220 may be configured to collect operational data from each of the wind turbines 202 in the wind farm 200 during the first operational mode. More specifically, in certain embodiments, the data may be part of the SCADA system for remote monitoring and control of the wind farm 200 that operates with coded signals over communication channels. In one embodiment, the wind parameters and/or the operational data may be generated via one or more of the sensors (e.g. via sensors 65, 66, 68, 216, 218, or any other suitable sensor). In addition, the wind parameters and/or the operational data may be determined via a computer model within the one of the controllers 26, 220 to reflect the real-time conditions of the wind farm 200.

The operational data as described herein may include information regarding at least one of or a combination of the following: nacelle position, power output, torque output, pitch angle, tip speed ratio, rotor speed, yaw angle, thrust, operating state, curtailment demands, geographical information, temperature, pressure, wind turbine location, wind farm location, weather conditions, wind gusts, wind speed, wind direction, wind acceleration, wind turbulence, wind shear, wind veer, wake, or any other operational and/or wind conditions of the wind farm 200.

In additional embodiments, the controllers 26, 220 (or a separate computer) may be configured to filter, average, and/or adjust the operational data. In one embodiment, for example, the method 150 may include organizing the collected operational data into a plurality of time-series and averaging the turbine-level data in each of the time-series 202. More specifically, in certain embodiments, each of the time-series may be ten-minute intervals. In further embodiments, the operational data may be organized into any suitable time intervals including less than ten minutes and more than ten minutes.

Figure 6:
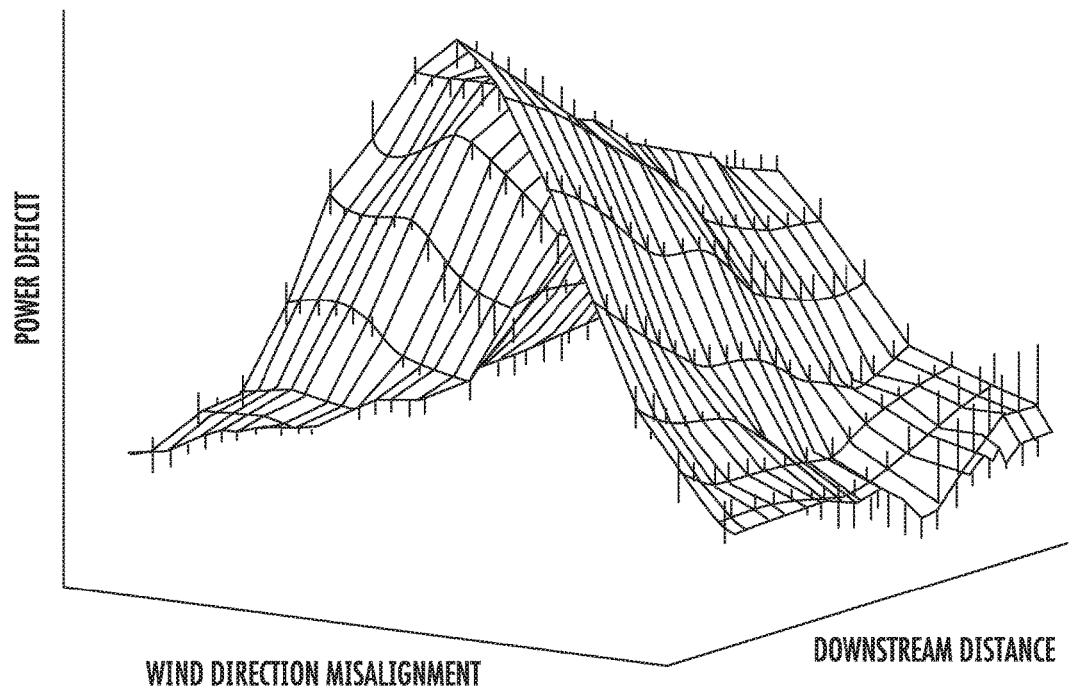
FIG. 6 illustrates a graph of one embodiment of a map of pairwise performance between interacting wind turbines in a first operational mode according to the present disclosure.

Referring still to FIG. 5, as shown at 154, the method 150 includes identifying one or more pairs 104 of wind turbines 202 having wake interaction during the first operational mode. For example, as shown in FIG. 4, the identified wind turbine pairs 104 may include an upstream turbine and downstream turbine with respect to the wind direction 102. Thus, as shown at 156, the method 150 also includes generating a pairwise dataset 106 for the pairs 104 of wind turbines 202, i.e. based on the map of wake interaction turbines 104 as shown in FIG. 6. More specifically, in particular embodiments, the pairwise dataset 106 may include a relative wind direction between the pairs, a pair distance, a turbulence intensity at a corresponding free stream turbine for each of the pairs, and a power at an upstream wind turbine, a power at a downstream wind turbine, and/or a power at a corresponding free stream turbine, or any combinations thereof.

Further, as shown at 158, the method 150 includes generating a first wake model 110 based on the pairwise dataset 106. For example, in one embodiment as shown in FIG. 4, the first wake model 110 is represented by Equation (1) below, wherein the model is built as a function of the pairwise datasets:

$$1 - \frac{P_{down}}{P_{up}} = f(\beta, s, TI_{up}, P_{up}) \qquad \text{Equation (1)}$$

Where $P_{down}$ is the power output of the downstream wind turbine,
$P_{up}$ is the power output of the upstream wind turbine,
$\beta$ is the relative wind direction between the turbine pairs,
s is the distance between the turbine pairs, and
$TI_{up}$ is the turbulence intensity of the upstream wind turbine.

More specifically, in certain embodiments, the controllers 26, 220 (or a separate computer) may be configured to generate the first wake model 110 using Gaussian Kernel Regression. As used herein, Gaussian Kernel Regression generally refers to a non-parametric statistics technique for estimating the conditional expectation of a random variable, or finding a non-linear relationship between a pair of random variables, i.e. the pairwise datasets of the turbine pairs 104. In still further embodiments, the first wake model 110 may be generated using any other suitable methods.

In another embodiment, the method 150 may include tuning the first wake model 110 to reduce a first operational mode prediction error. For example, in one embodiment, the first wake model 110 may be tuned by minimizing the prediction error for the first operational mode data itself. More specifically, in certain embodiments, the first wake model 110 can be fine-tuned using Equation (2) below so as to reduce the first operational mode prediction error:

$$\frac{\sum P_{actual}}{\sum P_{freeactual} + P_{wakepredicted}} \qquad \text{Equation (2)}$$

Wherein $P_{actual}$ is the actual power output of a wind turbine,
$P_{freeactual}$ is the actual power output of a freestream wind turbine, and $P_{wakepredicted}$ is the predicted power output of a downstream wind turbine affected by wake.

Referring still to FIGS. 4 and 5, as shown at 160, the method 150 includes operating the wind farm 200 in a second operational mode and collecting operational data during the second operational mode. For example, the second operational mode may be characterized, at least, by occurring over a different time period or wind resource than the first operational mode. Further, in one embodiment, the second operational mode may correspond to an optimized operational mode, e.g. with the one or more wake controls provided to the wind farm 200. In additional embodiments, the method 150 may include operating the wind farm 200 in the second operational mode without toggling to the first operational mode.

As shown at 162, the method 150 may also include predicting a first farm-level performance parameter for the second operational mode using the first wake model 110 and the operational data collected during the second operational mode. More specifically, in certain embodiments, the controllers 26, 220 (or a separate computer) may be configured to predict the first farm-level performance parameter 114 by collecting operational data from one or more wind turbines 202 in the wind farm 200 during the first operational mode, building the first wake model 110 based on the operational data collected during the second operational mode to predict the power at one or more downstream turbines, applying the first wake model 110 to predict the power output for the one or more downstream wind turbines during the second operational mode (see FIG. 4 at 112 and 114), summing the power output from the one or more downstream wind turbines 202, and determining a total first power output by summing a power output from each of the remaining wind turbines 202 during the first operational mode with the summed power output from the one or more downstream wind turbines 202.

In addition, as shown at 164, the method 150 may include determining a second farm-level performance parameter 116 (FIG. 4) during the second operational mode. For example, in one embodiment, the first and second farm-level performance parameters 114, 116 may include a power output for the first and second operational modes, respectively. More specifically, in certain embodiments as shown in FIG. 4, the controllers 26, 220 (or a separate computer) may be configured to determine the second farm-level performance parameter 116 by collecting operational data from one or more wind turbines 202 in the wind farm 200 during the second operational mode, determining a power output for each of the wind turbines 202 based on the collected operational data, and summing the power outputs from each of the wind turbines 202 during the second operational mode to determine a total second power output.

Thus, as shown at 166, the method 150 includes determining a difference in the farm-level performance of the wind farm 200 as a function of the first and second farm-level performance parameters 114, 116. For example, as shown in FIG. 4, the controllers 26, 220 (or a separate computer) may be configured to determine the difference in the farm-level performance 118 of the wind farm 200 by comparing the first and second farm-level performance parameters 114, 116. More specifically, in certain embodiments, the controllers 26, 220 (or a separate computer) may be configured to determine the difference in the farm-level performance 118 of the wind farm 200 by comparing the total second operational mode power output and the total first operational mode power output. For example, in one embodiment, the controllers 26, 220 (or a separate computer) may be configured to determine the difference in the farm-level performance difference of the wind farm 200 by determining a power difference between the total second operational mode power output and the total first operational mode power output over a predetermined time period, binning the power difference by farm inflow wind speed and wind direction, and weighting the binned power differences by long-term wind distribution or other wind distribution of interest, e.g. the distribution observed during the second operational mode test period, thus assessing the impact between the two modes on farm-level energy production.

In addition, in certain embodiments, as shown in FIG. 4, the controllers 26, 220 (or a separate computer) may be configured to verify the farm-level performance of the wind farm 200 by generating a second wake model 120 for the second operational mode, estimating a first power output and a second power output from the first and second wake models 110, 120, and comparing the first power output and the second power output so as to verify the farm-level performance 118.

Figure 7:
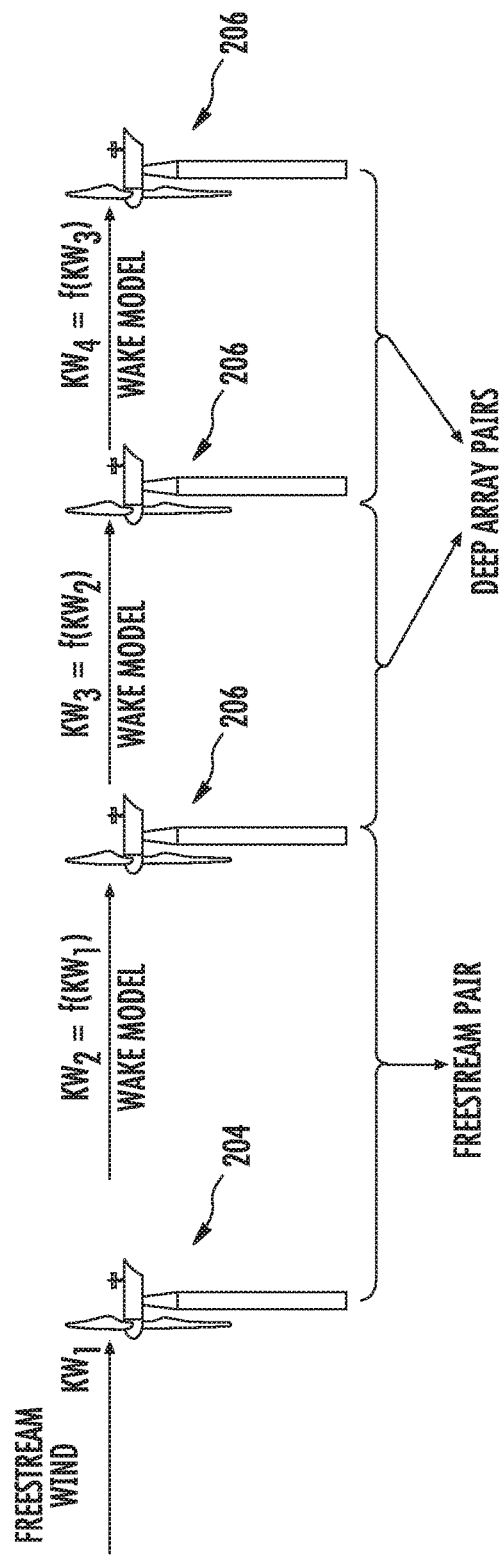
FIG. 7 illustrates a schematic diagram of one embodiment of a wind farm, particularly illustrating a freestream wind turbine pair and a plurality of deep array wind turbine pairs according to the present disclosure.

Referring now to FIG. 7, a schematic diagram of one embodiment of cascading the wake models 110, 120 to compute power for downstream turbines 206 with respect to a freestream turbine 204 in the wind farm 200 is illustrated. For example, as shown, the first power ($kW_1$) is used to compute the second power ($kW_2$) via the wake model 110, the second power ($kW_2$) is used to compute the third power ($kW_3$) via the wake model 110, and so on.

Figure 8:
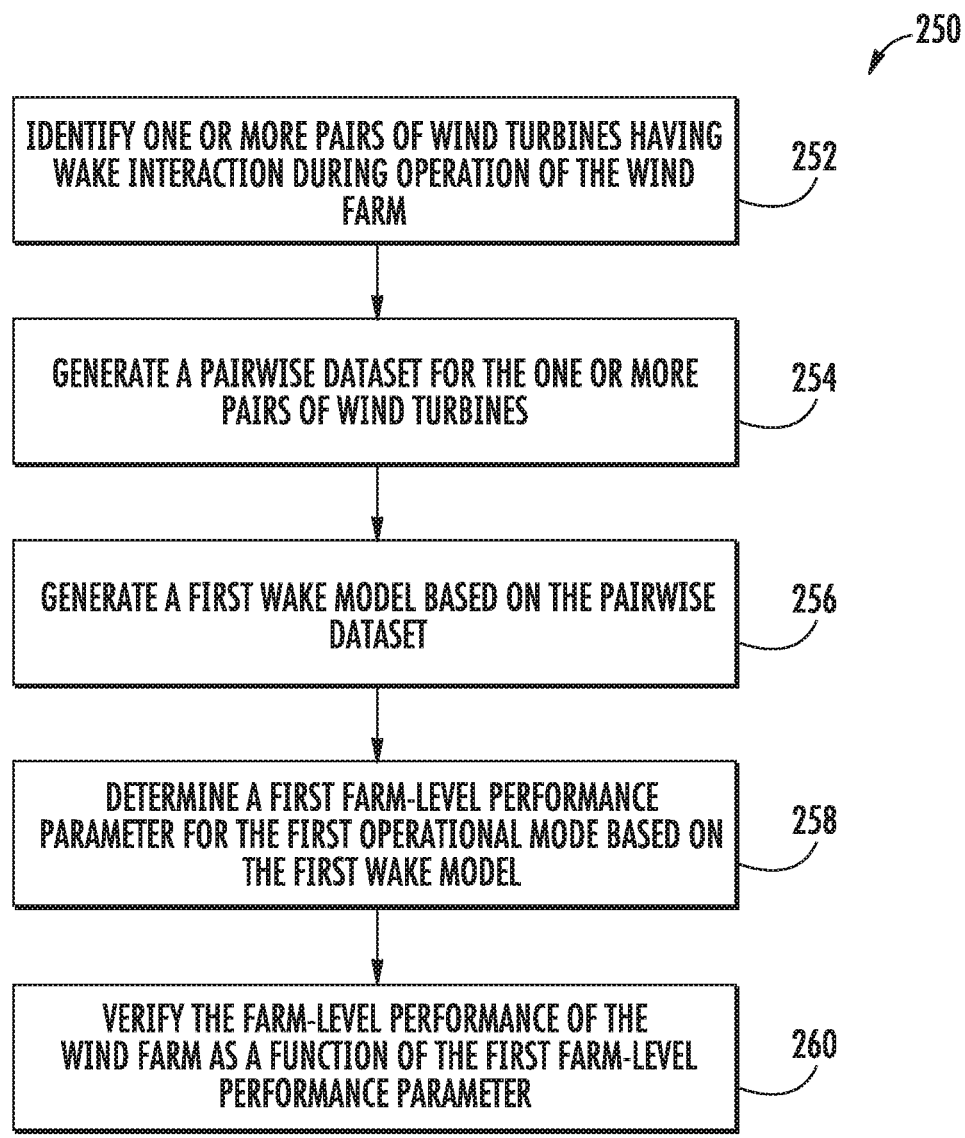
FIG. 8 illustrates a flow diagram of another embodiment of a method for verifying farm-level performance of a wind farm according to the present disclosure.

Referring now to FIG. 8, a flow diagram of another embodiment of a method 250 for verifying farm-level performance of a wind farm 200 is illustrated. As shown at 252, the method 250 includes identifying one or more pairs of wind turbines 202 having wake interaction during operation of the wind farm 200. As shown at 254, the method 250 generating a pairwise dataset for the one or more pairs of wind turbines 202. As shown at 256, the method 250 generating a first wake model based on the pairwise dataset. As shown at 258, the method 250 determining a first farm-level performance parameter for the first operational mode based on the first wake model. As shown at 260, the method 250 also includes verifying the farm-level performance of the wind farm 200 as a function of the farm-level performance parameter.

Exemplary embodiments of a wind farm, a controller for a wind farm, and a method for controlling a wind farm are described above in detail. The method, wind farm, and controller are not limited to the specific embodiments described herein, but rather, components of the wind turbines and/or the controller and/or steps of the method may be utilized independently and separately from other components and/or steps described herein. For example, the controller and method may also be used in combination with other power systems and methods, and are not limited to practice with only the wind turbine controller as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm, the method comprising:
operating the wind farm in a first operational mode for a predetermined time period;
identifying one or more pairs of wind turbines having wake interaction during the first operational mode;
generating a pairwise dataset for the one or more pairs of wind turbines;
generating a first wake model based on the pairwise dataset;
operating the wind farm in a second operational mode and collecting operational data during the second operational mode, the second operational mode being operated at a different time period than the first operational mode;
predicting a first farm-level performance parameter for the second operational mode using the first wake model and the operational data collected during the second operational mode;
determining a second farm-level performance parameter during the second operational mode;
assessing farm-level performance of the wind farm by comparing the first and second farm-level performance parameters;
selecting to operate the wind farm in the first operational mode or the second operational mode based on the comparison without toggling between the first and second operational modes; and,
controlling the wind farm based on the selected mode.

2. The method of claim 1, wherein the first and second farm-level performance parameters comprise a power output for the first and second operational modes, respectively.

3. The method of claim 1, wherein determining the second farm-level performance parameter further comprises:
collecting operational data from one or more wind turbines in the wind farm during the second operational mode,
determining a power output for each of the wind turbines in the wind farm based on the collected operational data, and
summing the power outputs from each of the wind turbines in the wind farm during the second operational mode to determine a total second power output.

4. The method of claim 3, wherein predicting the first farm-level performance parameter further comprises:
collecting operational data from one or more wind turbines in the wind farm during the first operational mode, and
building the first wake model based on the collected operational data from the one or more wind turbines to predict the power at one or more downstream turbines.

5. The method of claim 4, further comprising applying the first wake model to predict power output for the one or more downstream wind turbines during the second operational mode,
summing the power output from the one or more downstream wind turbines, and
determining a total first power output by summing a power output from each of the remaining wind turbines in the wind farm during the second operational mode with the summed power output from the one or more downstream wind turbines.

6. The method of claim 1, wherein generating the first wake model based on the pairwise datasets further comprises generating the first wake model using Gaussian Kernel Regression.

7. The method of claim 1, further comprising tuning the first wake model to reduce a prediction error of the first wake model.

8. The method of claim 5, wherein assessing farm-level performance of the wind farm as a function of the first and second farm-level performance parameters further comprises comparing the total second power output and the total first power output.

9. The method of claim 1, wherein assessing farm-level performance of the wind farm as a function of the first and second farm-level performance parameters further comprises:
determining a power difference between the total second power output and the total first power output over a predetermined time period,
binning the power difference by farm inflow wind speed and wind direction, and
weighting the binned power differences by a wind distribution.

10. The method of claim 1, wherein assessing farm-level performance of the wind farm as a function of the first and second farm-level performance parameters further comprises:
generating a second wake model for the second operational mode,
estimating a first power output and a second power output from the first and second wake models, and
comparing the first power output and the second power output so as to verify the farm-level performance.

11. The method of claim 1, wherein the pairwise dataset for each of the pairs comprises at least one of a relative wind direction between the pairs, the distance between the pair, a turbulence intensity, a power at an upstream wind turbine, a power at a downstream wind turbine, and a power at a corresponding freestream turbine.

12. The method of claim 1, wherein the operational data comprises at least one of or a combination of the following: nacelle position, power output, torque output, pitch angle, tip speed ratio, rotor speed, yaw angle, thrust, operating state, curtailment demands, geographical information, temperature, pressure, wind turbine location, wind farm location, weather conditions, wind gusts, wind speed, wind direction, wind acceleration, wind turbulence, wind shear, wind veer, or wake.

13. A system for controlling a wind farm, the system comprising:
one or more sensors configured to measure operational data of the wind farm; and
one or more controllers communicatively coupled with the one or more sensors, the one or more controllers configured to perform one or more operations, the one or more operations comprising:
operating the wind farm in a first operational mode for a predetermined time period,
identifying one or more pairs of wind turbines having wake interaction during the first operational mode,
generating a pairwise dataset for the one or more pairs of wind turbines,
generating a wake model based on the pairwise dataset, operating the wind farm in a second operational mode and collecting operational data during the second operational mode, the second operational mode being operated at a different time period than the first operational mode;

predicting a first farm-level performance parameter for the second operational mode using the first wake model and the operational data collected during the second operational mode;

determining a second farm-level performance parameter during the second operational mode, and assessing farm-level performance of the wind by comparing the first and second farm-level performance parameters;

selecting to operate the wind farm in the first operational mode or the second operational mode based on the comparison without toggling between the first and second operational modes; and, controlling the wind farm based on the selected mode.

14. The system of claim 13, wherein determining the second farm-level performance parameter further comprises:

collecting operational data from one or more wind turbines in the wind farm during the second operational mode, determining a power output for each of the wind turbines in the wind farm based on the collected operational data, and summing the power outputs from each of the wind turbines in the wind farm during the second operational mode to determine a total second power output.

15. The system of claim 13, wherein predicting the first farm-level performance parameter further comprises:

collecting operational data from one or more wind turbines in the wind farm during the first operational mode, building the first wake model based on the collected operational data from the one or more wind turbines to predict the power at one or more downstream turbines, applying the first wake model to predict power output for the one or more downstream wind turbines during the second operational mode, summing the power output from the one or more downstream wind turbines, and determining a total first power output by summing a power output from each of the remaining wind turbines in the wind farm during the second operational mode with the summed power output from the one or more downstream wind turbines.

16. The system of claim 15, wherein assessing farm-level performance of the wind farm as a function of the first and second farm-level performance parameters further comprises comparing the total first and second power outputs.

17. The system of claim 13, wherein assessing farm-level performance of the wind farm as a function of the first and second farm-level performance parameters further comprises:

determining a power difference between the total second power output and the total first power output over a predetermined time period, binning the power difference by farm inflow wind speed and wind direction, and weighting the binned power differences by a wind distribution.

18. The system of claim 13, wherein assessing farm-level performance of the wind farm as a function of the first and second farm-level performance parameters further comprises:

generating a second wake model for the second operational mode, estimating a first power output and a second power output from the first and second wake models, and comparing the first power output and the second power output so as to verify the farm-level performance.

\* \* \* \* \*